US005903909A

United States Patent [19]

Pehkonen

[11] Patent Number: 5,903,909

[45] Date of Patent: May 11, 1999

[54] METHOD AND ARRANGEMENT FOR STORING ON TAPE INFORMATION PRODUCED BY A SWITCHING EXCHANGE SYSTEM

[75] Inventor: Tapio Pehkonen, Helsinki, Finland

[73] Assignee: Nokia Telecommunications Oy, Espoo, Finland

[21] Appl. No.: 08/793,091

[22] PCT Filed: Aug. 15, 1995

[86] PCT No.: PCT/FI95/00428

§ 371 Date: Feb. 18, 1997

§ 102(e) Date: Feb. 18, 1997

[87] PCT Pub. No.: WO96/06396

PCT Pub. Date: Feb. 29, 1996

[30] Foreign Application Priority Data

Aug. 18, 1994 [FI] Finland .................................... 943802

[51] Int. Cl.[6] ...................................................... G06F 12/00

[52] U.S. Cl. ............................. 711/122; 711/117; 360/39; 360/48; 360/50

[58] Field of Search .............................. 395/182.06, 831; 360/48, 39, 72.1, 50; 711/122, 117

[56] References Cited

U.S. PATENT DOCUMENTS 3,931,471 1/1976 Geuens et al. .
4,380,047 4/1983 Eisenhard et al. .

FOREIGN PATENT DOCUMENTS 683467 3/1994 Switzerland .
92/14204 8/1992 WIPO .

OTHER PUBLICATIONS

Patent Abstract of Japan, Control System for Streaming Magnetic Tape Device, Publication No. 62121904A, Mar. 6, 1987.

Patent Abstract of Japan, Magnetic Tape Subsystem, Publication No. 02240718A, Sep. 25, 1990.

Patent Abstract of Japan, Storing Method for Data Stored in Magnetic Tape Device into Disk Device, publication No. 05250101A, Sep. 28, 1993.

Patent Abstract of Japan, Storage Controller, publication No. 03080470A, Apr. 5, 1991.

*Primary Examiner*—Tod R. Swann
*Assistant Examiner*—Fred F. Tzeng
*Attorney, Agent, or Firm*—Pillsbury Madison & Sutro LLP

[57] ABSTRACT

A method and arrangement for storing on tape information produced by a switching exchange system, by reading data into an intermediate file for increasing the number of records to be stored to an amount suitable for the capacity of the recorder used; copying the intermediate file into a backup storage; and emptying the intermediate file to a tape for a new read cycle of information produced by the switching exchange system.

8 Claims, 1 Drawing Sheet

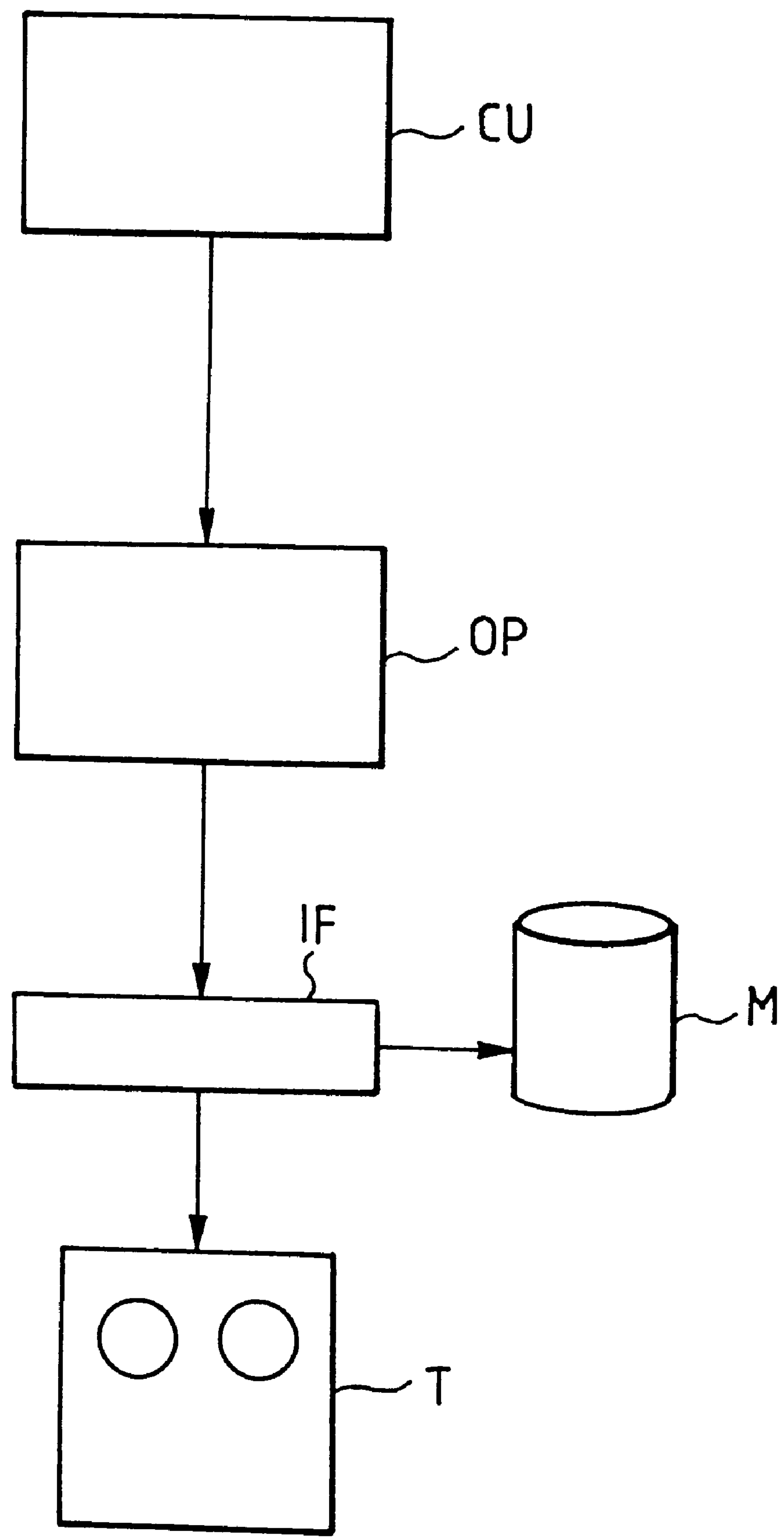
CU
OP
IF
M
T

METHOD AND ARRANGEMENT FOR STORING ON TAPE INFORMATION PRODUCED BY A SWITCHING EXCHANGE SYSTEM

This application is the national phase of international application PCT/F195/00428 filed Aug. 15, 1995 which designated the U.S.

BACKGROUND OF THE INVENTION

The invention relates to a method and arrangement for storing on tape information produced by a switching exchange system. The requirements for storing data in exchange systems vary widely. Charging data and different traffic measurement reports are stored by magnetic tape recorders. In addition, backup copies of disk files are usually stored on magnetic tape. It is worth storing data on magnetic tape if larger amounts are to be stored into a portable permanent storage.

Charging data are produced as a switching exchange switches calls. Charging data is stored on magnetic tape almost in real time, and thus the amount of data to be stored at a time may be small. In addition, data storage is periodic and non-predefined, as the frequency for storing data depends on the number of calls.

The requirements set by switching exchange systems on storage of charging information are continuously increasing. The required traffic volumes grow. In addition, the trend is increasingly toward call-by-call charging, in regard to which records to be stored on tape are produced from each call. The amount of data to be stored is so large that the capacities of conventional start/stop-type recorders currently used in storing charging information are insufficient with high traffic. On the other hand, streamer-type recorders are too slow with low traffic.

Magnetic recorders are classified in two categories based on the storage type: start/stop-type recorders and streamer-type recorders. Start/stop recorders start tape movement always when the recorder receives a data block to be stored and stop the tape after storing the data block. Streamer-type recorders do not stop the tape between data blocks if a new block reaches the recorder soon enough.

Start/stop recorders are faster than streamer recorders when data are stored in relatively small amounts at a time, as in start/stop recorders stopping and starting the tape is mechanically realized significantly faster than in streamer recorders. If data can be stored on tape as a continuous data stream so that the recorder does not have to stop the tape before a new data block to be stored reaches the recorder, a streamer recorder is faster. In this case, storage rate is about equal to that of hard disks. In addition, the storage capacity of streamer recorders is usually considerably higher, around several gigabytes, than that of start/stop recorders, which is below 100 megabytes. If a streamer recorder is used for storing small amounts of data so that the recorder stops the tape before the next data to be stored reaches the recorder, one storage may, depending on the recorder, require even 15 seconds, if the length of the data to be stored is less than 1 kB.

The total storage capacity of streamer recorders decreases the more frequently the tape has to be stopped during storage. During stop and start the tape moves considerably before the speed of the tape is adequate for storage or until the tape has stopped. This part of the tape cannot be used for storage of useful data. The mechanics of start/stop recorders prevent a corresponding long interval, where no useful data can be stored, from being created on the tape.

SUMMARY OF THE INVENTION

An object of this invention is to provide a method and an arrangement by means of which a high-capacity streamer-type recorder may be used in all storage situations. The method of the invention is characterized in that storage is effected in the following steps:

reading data into an intermediate file for increasing the number of records to be stored to an amount suitable for the capacity of the recorder used;

copying the intermediate file into a backup storage; and emptying the intermediate file to a tape for a new read cycle of information produced by the switching exchange system.

In accordance with the invention, the software controlling the recorder sees to it that data are written to the recorder in an adequately sized whole for keeping the recorder in the streamer mode during the entire storage. For the software producing the data, i.e. requiring storage, this is a completely invisible operation.

Generally, an application software producing data requires confirmation of the data having been stored into a permanent storage. Thus the application software must not be notified of a successful data storage before confirmation of successful data storage has been received from the permanent storage.

The solution of the invention is in no way related to known virtual and cache memories in which data selected by certain criteria are kept, in a disk or main storage, accessible to the central processing unit of a computer. In the invention, the data passing via an intermediate memory is unidirectional (on its way to a mass storage for final storage) and irrelevant as to the function of the central processing unit, and the storage may thus be preferably effected as a background run.

BRIEF DESCRIPTION OF THE DRAWING

In the following, the invention will be described in more detail by way of an example with reference to the accompanying drawing, which is a block diagram of an arrangement according to the invention.

DETAILED DESCRIPTION

When a software OP controlling a recorder has received data to be stored from a central processing unit CU of a switching exchange system, it stores the data in an intermediate file IF, situated in RAM (Random Access Memory). A copy of the intermediate file is maintained in a fast permanent storage memory M, which may be a hard disk, a battery-backup RAM disk or any fast medium, where data remains stored even after a power failure. After the data are stored into a file and the file are stored into a permanent storage, a message of successful storage is sent to the software which sent the data. At this point the data are thus necessarily not yet on the tape.

Data storage from the intermediate file IF to a tape may be started when enough data are stored in the intermediate file. This is automatically effected as a background run. The software OP controlling the recorder T identifies the type of recorder used and defines the storage limits accordingly. If the apparatus to be controlled is a start/stop recorder, intermediate storage is not required. Thus, the intermediate file of the invention preferably is used only when necessary. Even when a streamer recorder is used as a backup unit for disk files, the intermediate file is not needed, as the backup copying is adequately fast as such for keeping the recorder in streamer mode. When the recorder T is again used for storing charging data, the intermediate file IF is taken into use.

The purpose of use of the recorder T (backup, storage of charging, etc.) is stored into a file controlled by the control software OP of the recorder. An operator may set the desired purpose of use of the recorder. The operator may also, by a command, empty the intermediate storage to a tape, e.g. in connection with change of tape.

The intermediate file IF is only in the immediate use of the software (OP) controlling the recorder. Protection offered by the operating system is used for file protection. If the exchange system computer unit is doubled, the intermediate file IF in the RAM must be copied also to the backup unit. The copy of the intermediate file IF in the fast permanent storage M must be protected from other users of file services. Taking a backup copy of the file IF must, however, be possible. The intermediate file also contains information stating if data storage to the intermediate file IF is in process and also if emptying of the intermediate file to a tape is in process. When the file is being emptied to a tape, other storage tasks directed to the tape in question are not dealt with until the intermediate file has been emptied.

When a computer unit CU is started, the control software OP checks if data have been stored into the intermediate file IF. If the file contains data and the emptying of the file to the tape is uncompleted, i.e. if the central processing unit CU is reset when the intermediate file IF is being emptied to the tape, the emptying must be continued from the right point. By comparing the data at the end of the tape with the data in the intermediate file, the starting point can be found and the emptying of the intermediate file may be continued from the right point.

If the break point is not found by comparing the data, the interpretation is that the resetting has occurred after the storage was started, but before the data was copied to the tape. Consequently, the whole of the data in the intermediate file IF may be written to the tape after the existing data. Emptying the intermediate file is, in any case, started after restart of the central processing unit CU if the intermediate file contains data that has not been stored.

Each time the control software OP of the recorder T receives data to be stored, it first tries to store the intermediate file IF into a permanent storage. If this fails, the data are immediately stored on tape, and thus the intermediate file is not used until storage into the permanent storage again succeeds. The control software of the recorder will set an alarm if storage of the intermediate file IF into the permanent storage M or on tape fails. If storing the intermediate file into the permanent storage fails, the intermediate file is emptied to a tape. The application software receives confirmation only after the data is stored on tape.

An error message is sent to the application software if storage on tape fails and the intermediate file IF is not used. At this point, the application may, if desired, retry to store the data. Confirmation to the application software is not sent until the data are stored (or has been attempted to be stored) into a permanent storage. In case of an error during storage on tape when the intermediate file is being used, the application software receives no error confirmation thereof. The data are, however, stored in the permanent storage M, i.e. the data are not lost and the application has no need to restore the data.

The data are stored in the intermediate file if the tape drive is damaged or the tape is full. When the recorder is again in working order, the intermediate file is automatically emptied to the tape on the same principle as when the computer unit is started.

It is evident to a person skilled in the art that the different embodiments of the invention are not limited to the above example, but may vary freely within the scope of the attached claims.

I claim:

1. A method for storing on tape information produced by a switching system, comprising the steps of:

(a) reading information produced by the switching system, as data, into an intermediate file in at least one reading event, for thereby accumulating, as records stored in said intermediate file, an amount of records suitable for storing on tape in a recorder in one storing event;

(b) in connection with conducting each said reading event, copying the respective data from said intermediate file into a backup storage;

(c) after step (b) has been accomplished, emptying data records accumulated in the intermediate file as a consequence of conducting step (a), by storing those data records on tape in the recorder in one storing event; and (d) repeating steps (a)–(c) at least once.

2. The method of claim 1, further comprising:

after conducting step (b) but before conducting step (c), providing confirmation to a software system which has controlled supplying of the information read in step (a), that the respective said information has been stored.

3. The method of claim 1, comprising:

using as the backup storage into which the respective data is copied in step (b) a storage medium in which persistence of the respective copy thereby made is not dependent on continual supply of power to the backup storage.

4. The method of claim 1, further comprising:

after a conducting of step (a) has been successfully completed, detecting that a respective conducting of step (b) has failed to be successfully completed, and, in consequence of said detecting emptying data records accumulated in the intermediate file as a consequence of conducting step (a), by storing those data records on tape in the recorder in one storing event; and only after said emptying has been completed, including accomplishing said storing of respective data records on tape in the recorder, providing confirmation to a software system which has controlled supplying of the information read in step (a), that the respective said information has been stored.

5. An arrangement for storing on tape information produced by a switching system, comprising:

an intermediate file arranged to have read thereinto in at least one reading event, information produced by the switching system, as data, for thereby accumulating, as records stored in said intermediate file, an amount of records suitable for storing on tape in a recorder in one storing event;

a backup storage arranged to have copied thereinto from said intermediate file in connection with conducting of each said reading event, the respective data from said intermediate file;

a tape recorder arranged to have emptied thereinto for storage on tape therein in a respective storage event data records accumulated in said intermediate file as a consequence of conducting said at least one reading event; and a software program functionally related to said intermediate file, backup storage and tape recorder, for controlling said storing on tape.

6. The arrangement of claim 5, wherein:

said intermediate storage is arranged to provide confirmation to said software program that respective information has been stored, upon completion of copying of said respective data into said backup storage but prior to emptying of said accumulated data records into said tape recorder.

7. The arrangement of claim 5, wherein:

said backup storage has provided therein for respective data to be copied thereinto, using as the backup storage into which the respective data is copied in step (b) a storage medium in which persistence of the respective copy thereby made is not dependent on continual supply of power to the backup storage.

8. The arrangement of claim 5, wherein:

said tape recorder is a streamer-type tape recorder.

* * * * *